United States Patent

Sasse et al.

[15] 3,671,639

[45] June 20, 1972

[54] 1-PHENYL-4,4-DI-SUBSTITUTED-THIOSEMICARBAZIDE FUNGICIDAL AND ACARICIDAL AGENTS

[72] Inventors: Klaus Sasse; Hans Scheinpflug; Ferdinand Grews, all of c/o Farbenfabriken Bayer AG, Leverkusen, Germany

[22] Filed: June 30, 1969

[21] Appl. No.: 837,933

[30] Foreign Application Priority Data

July 2, 1968 Germany .....................P 17 67 924.2

[52] U.S. Cl..............................424/323, 424/246, 424/248, 424/267, 424/274
[51] Int. Cl. ...........................................................A01n 9/12
[58] Field of Search ................................424/323, 248, 246

[56] References Cited

UNITED STATES PATENTS 3,262,845   7/1966   Pluijgers...............................424/323

OTHER PUBLICATIONS

Chemical Abstracts, Vol. 65, Item 14354c, 1966.

Primary Examiner—Albert T. Meyers
Assistant Examiner—Doris J. Funderburk
Attorney—Burgess, Dinklage & Sprung

[57] ABSTRACT

Fungicidal and acaricidal compositions of and methods of combatting fungi and acarids using certain 1-phenyl-4,4-di-substituted-thiosemicarbazides, i.e., 1-(optionally mono to tri chloro, bromo, methyl and methoxy -substituted)-phenyl-4,4-[di(alkyl and alkenyl) or tetramethylene, pentamethylene, oxa -pentamethylene or thia-pentamethylene]-thiosemicarbazides.

9 Claims, No Drawings

1-PHENYL-4,4-DI-SUBSTITUTED-THIOSEMICARBAZIDE FUNGICIDAL AND ACARICIDAL AGENTS

The present invention relates to and has for its objects the provision for fungicidal and acaricidal compositions of certain 1-phenyl-4,4-di-substituted-thiosemicarbazides, i.e., 1-(optionally mono to tri chloro, bromo, methyl and methoxy-substituted)-phenyl-4,4-[di(alkyl and alkenyl) or tetramethylene, pentamethylene, oxa-pentamethylene or thia-pentamethylene]-thiosemicarbazides, some of which are known, and which possess fungicidal and acaricidal properties, in the form of mixtures of such compounds with solid and liquid dispersible carrier vehicles, preferably containing a surface-active agent, and methods for using such compounds in a new way especially for combatting pests, e.g., fungi and acarids, with other and further objects becoming apparent from a study of the within specification and accompanying examples.

It is known that 1-phenyl-thiosemicarbazides, including 1-phenyl-thiosemicarbazide (A) per se and 1-phenyl-thiosemicarbazides which are substituted in the phenyl radical by chlorine, methyl and/or methoxy, possess fungicidal properties, for example, towards mold fungi (see German Patent 1,174,103).

It has been found, in accordance with the present invention, that certain 1-phenyl-4,4-di-substituted-thiosemicarbazides, e.g., 1-phenyl-4,4-di-alkyl-thiosemicarbazides, some of which are known, of the formula

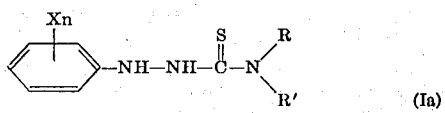

(Ia)

in which
X is chloro, bromo, methyl or methoxy,
$n$ is a whole integer from 0–3,
X being the same or different when $n$ is 2 or 3, and
R and R', each individually, is alkyl of one to four carbon atoms or alkenyl of three to four carbon atoms,
with the proviso that R and R' when taken together with the adjacent N-atom form pyrrolidino, piperidino, morpholino or thiazino,
exhibit strong fungicidal and acaricidal properties.

Of the known 1-phenyl-4,4-di-substituted-thiosemicarbazides which can be used according to the present invention, no pesticidal properties have heretofore been known with respect to them.

It is very surprising that such compounds of formula (Ia) above which are usable according to the present invention have considerably stronger fungicidal properties than the known phenyl-thiosemicarbazides, such as 1-phenyl-thiosemicarbazide (A), previously known to be usable as fungicides. Added to this are the markedly good curative and systemic fungicidal activity of the instant compounds as well as the acaricidal activity thereof and their significant complementary insecticidal effect. The aforesaid known compounds previously known for such pesticidal purposes clearly do not have all these properties. The pesticidal compositions and methods of combatting fungi and acarids using such active compounds according to the present invention therefore represent a valuable enrichment of the art.

The 1-phenyl-4,4-substituted-thiosemicarbazides of the present invention are clearly characterized by the above formula (Ia).

Advantageously, in accordance with the present invention, in the various formulas herein:
X, each individually, represents
  chloro;
  bromo;
  methyl; or
  methoxy;
$n$ represents
  a whole number from 0 to 3, i.e., 0, 1, 2, or 3, especially 0–1;

X being the same or different when $n$ is 2 or 3, such that, when $n$ is 1–3, $X_n$ represents as nuclear positions on the corresponding phenyl moiety:
2-, 3- and 4-mono-; 2,3-, 2,4-, 2,5-, 2,6-, 3,4- and 3,5-di- (same or mixed); and 2,3,4-, 2,3,5-, 2,3,6-, 2,4,5-, 2,4,6- and 3,4,5-tri- (same or mixed); -chloro, bromo, methyl and/or methoxy; and the like; especially 2- and 4- chloro, 4-bromo, 4-methyl, 4-methoxy, 2,3-, 2,4- and 3,4-dichloro, 2,3,6- and 2,4,6-trichloro, 3-chloro-4-methyl and 3-chloro-4-methoxy;
$n$ preferably being 0–1 such that, when $n$ is 1, X is preferably chloro and especially 4-chloro; and
R and R', each individually, represents
  straight and branched chain lower alkyl hydrocarbon of one to four carbon atoms such as methyl, ethyl, n- and iso- propyl, n-, iso-, sec.- and tert.-butyl, and the like, especially $C_{1-3}$ or $C_{1-2}$ alkyl; or
  straight and branched chain lower alkenyl hydrocarbon of three to four carbon atoms such as $\alpha$-, $\beta$- and $\gamma$- allyl (i.e., prop-2-enyl, 1-methyl-vinyl and prop-1-enyl), but- 1,2 and 3-enyl, and the like, especially $C_3$ alkenyl, and more especially allyl, i.e., $\alpha$-allyl or prop-2-enyl;
R and R' preferably being the same;
with the proviso that R and R' when taken together with the adjacent N-atom represent
  pyrrolidino, i.e. N,N-tetramethylene;
  piperidino, i.e. N,N-pentamethylene;
  morpholino, especially para-morpholino, i.e. N,N-3'-oxa-pentamethylene; or
  thiazino, especially para-thiazino, i.e. N,N-3'-thia-pentamethylene.

Preferably, $n$ is 0–3 such that, when $n$ is 1–3, $X_n$ is 2-, 3- and 4-chloro, 2,3-, 2,4- and 3,4-dichloro, 2,3,6- and 2,4,6-trichloro, 4-bromo, 4-methyl, 4-methoxy, 3-chloro-4-methyl and 3-chloro-4-methoxy; and R and R', each individually, are $C_{1-4}$ or $C_{1-3}$ or $C_{1-2}$ alkyl, especially the same $C_{1-4}$ or $C_{1-3}$ or $C_{1-2}$ alkyl, or R and R' are the same $C_3$ alkenyl; with the proviso that R and R' when taken together with the adjacent N-atom represent pyrrolidino, piperidino or morpholino.

In particular, $n$ is 0–1; X is chloro, especially 4- chloro; and R and R' are (preferably the same) $C_{1-4}$ or $C_{1-3}$ or $C_{1-2}$ alkyl, or are both allyl, i.e. $\alpha$-allyl; with the proviso that R and R' when taken together with the adjacent N-atom represent pyrrolidino, piperidino or morpholino.

Table A sets forth examples of the active compounds of formula (Ia) above which can be used according to the present invention.

TABLE A 1. 1-phenyl-4,4-dimethyl-thiosemicarbazide
2. 1-phenyl-4,4-diethyl-thiosemicarbazide
3. 1-phenyl-4,4-di-n-propyl-thiosemicarbazide
13. 1-phenyl-4,4,-diisopropyl-thiosemicarbazide
4. 1-phenyl-4,4,di-n-butyl-thiosemicarbazide
5. 1-phenyl-4,4-diisobutyl-thiosemicarbazide
14. 1-phenyl-4,4,-di-sec.-butyl-thiosemicarbazide
6. 1-phenyl-4,4-diallyl-thiosemicarbazide
15. 1-phenyl-4-methyl-4-n-butyl-thiosemicarbazide
11. 1-phenyl-4,4-tetramethylene-thiosemicarbazide
9. 1-phenyl-4,4-(pentamethylene)-thiosemicarbazide
12. 1-phenyl-4,4-(3'-oxa-pentamethylene)-thiosemicarbazide
16. 1-phenyl-4,4-(3'-thia-pentamethylene)-thiosemicarbazide
7. 1-(4'-chloro-phenyl)-4,4-dimethyl-thiosemicarbazide
17. 1-(2'-chloro-phenyl)-4,4-dimethyl-thiosemicarbazide
18. 1-(2',3'-dichloro-phenyl)-4,4-dimethyl-thiosemicarbazide
19. 1-(2',4'-dichloro-phenyl)-4,4-dimethyl-thiosemicarbazide
20. 1-(3',4'-dichloro-phenyl)-4,4-dimethyl-thiosemicarbazide
21. 1-(2',3',6'-trichloro-phenyl)-4,4-dimethyl-thiosemicarbazide
22. 1-(2',4',6'-trichloro-phenyl)-4,4-dimethyl-thiosemicarbazide
23. 1-(4'-bromo-phenyl)-4,4-dimethyl-thiosemicarbazide
24. 1-(4'-methyl-phenyl)-4,4-dimethyl-thiosemicarbazide
25. 1-(4'-methoxy-phenyl)-4,4-dimethyl-thiosemicarbazide

(26) 1-(3'-chloro-4'-methyl-phenyl)-4,4-dimethyl-thiosemicarbazide
27. 1-(3'-chloro-4'-methoxy-phenyl)-4,4-dimethyl-thiosemicarbazide.
8. 1-(4'-chloro-phenyl)-4,4-diethyl-thiosemicarbazide.
10. 1-(4'-chloro-phenyl)-4,4-di-n-propyl-thiosemicarbazide Of the compounds of formula (Ia) above which may be used according to the present invention, only a few have been known up to now.

Thus, the preparation of 1-phenyl-4,4-di-n-propyl-thiosemicarbamide (3) has been described. It takes place by heating 1-phenyl-hydrazine-2-dithiocarboxylic acid with dipropyl-amine (or for example with piperidine or the like) to temperatures around 100° C [see Ber. d. Deutschen Chemischen Gesellschaft 30, 847 (1897)]. As a result of the tendency of the phenyl-hydrazine dithiocarboxylic acid to decompose, this reaction proceeds very non-uniformly, so that in this way the 1-phenyl-4,4-dialkyl or polymethylene-thiosemicarbazides can only be obtained as pure substances in low yields.

It is further known that 1-phenyl-4,4-dimethyl-thiosemicarbazide (1) can be prepared by reaction of phenyl-hydrazine with dimethyl-thiocarbamic acid chloride [see Ann. appl. Biol. 57 (3), 465 (1966)]. This process can also be applied to the preparation of the yet unknown thiosemicarbazides of formula (Ia) above, but possesses the disadvantage that the preparation of the thiocarbamic acid chlorides is complicated, time-consuming and often attended by poor yields.

All the compounds of formula (Ia) above may be produced in good yields and high purity by the process which comprises
a. reacting 1-phenyl-hydrazine-2-dithiocarboxylic acid esters of the formula

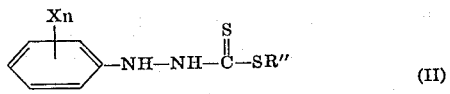
(II)

in which
X and $n$ are the same as defined above, and
R'' is alkyl of one to four carbon atoms, benzyl or carboxymethyl, with amines of the formula

(III)

in which
R and R' are the same as defined above, or
b. reacting phenyl-hydrazines of the formula

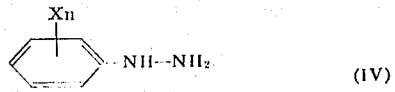
(IV)

in which
X and $n$ are the same as defined above, with dithiocarbamic acid esters of the formula

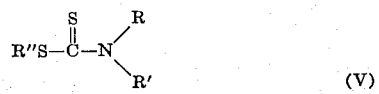
(V)

in which
R, R' and R'' are the same as defined above.

The starting phenyl-hydrazine-dithiocarboxylic acid esters of formula (II) above and the starting dithiocarbamic acid esters of formula (V) above are known in principle. These starting compounds are obtained, for example, by action of carbon disulfide and alkali metal hydroxides on the appropriate phenyl-hydrazines of formula (IV) above or secondary aliphatic amines of formula (III) above and subsequent alkylation with an R''-containing alkylating agent of the resultant alkali metal salts of the dithiocarbamic acids in question. The starting compounds of the formulas (III) and (IV) above, of course, are likewise known.

The reaction of the phenyl-hydrazine-dithiocarboxylic acid esters of formula (II) above with the secondary amines of formula (III) above (reaction [a]) and the reaction of the N,N-substituted-dithiocarbamic acid esters of formula (V) above with the phenyl-hydrazines of formula (IV) above (reaction [b]) can take place in the absence of diluents; but these reactions can also be carried out in solution or suspension, for which all inert organic solvents are suitable. These solvents include preferably hydrocarbons, such as ligroin, benzene, and toluene; ethers, such as dibutyl ether, dioxan, and tetrahydrofuran; alcohols, such as ethanol, butanol and glycol-monomethyl ether; and the like. The reactions can, however, also be carried out in water, especially when R'' represents a carboxymethyl group in the corresponding starting compound.

The production reactions are, in general, carried out at substantially between about 20°–150° C, preferably between about 50°–100° C; the work can be carried out either without applied pressure or in closed vessels.

The reaction components are preferably used in stoichiometric ratio, but, in the reactions according to (a), it is advantageous, when using readily volatile secondary amines, either to use an excess of these from the outset or to replace gradually in the course of the reaction the portions lost by evaporation.

The working up of the reaction mixtures takes place in customary manner, for example, by cooling and suction filtration of the crystallized product.

Advantageously, the active compounds according to the present invention exhibit strong fungitoxic activity against phytopathogenic fungi. Their good compatibility with warm-blooded creatures and with higher plants permits the use of the instant compounds as plant protection agents against fungal plant diseases. Significantly, in the concentrations necessary for the control of fungi, the instant compounds do not damage cultivated plants.

Fungitoxic agents in plant protection as contemplated herein are used for the control of fungi from the most diverse classes of fungi, such as Archimycetes, Phycomycetes, Ascomycetes, Basidiomycetes, and Fungi Imperfecti.

The active compounds according to the present invention have a very broad spectrum of activity. Such active compounds can be used against parasitic fungi on above-the-soil parts of plants, fungi which cause tracheomycosis, which attack the plant from the soil, seed-borne fungi and soil-inhabiting fungi.

The instant active compounds have given particularly good results in the control of rice diseases. Thus, such active compounds show an excellent activity against the fungi *Piricularia oryzae* and *Pellicularia sasakii*, so that they can be used for the joint control of these two diseases. This feature connotes a substantial advance, since, up to now, agents from different chemical groups had to be used against these two fungi. Surprisingly, the instant active compounds show not only a protective activity, but also a curative and systemic effect.

The active compounds of the present invention, however, also act against other fungi which infest rice or other cultivated plants, such as *Cochliobolus miyabeanus*, *Mycosphaerella musicola*, *Corcospora personata*, *Botrytis cinerea* and Alternaria species, Venturia species (causative organism of apple and pear scab), *Plasmopara viticola*; and the like. In addition, some of the compounds according to the present invention show a very distinct complementary-effect against powdery mildew fungi such as *Podosphaera leucotricha* (powdery mildew of apples) and *Erysiphe polyphage* (powdery mildew of cucumber).

Besides their fungicidal properties, the compounds according to the present invention also exhibit markedly good acaricidal and moderate insecticidal properties. In addition, such compounds also have a repellent effect with respect to birds.

The pesticidal effects of the instant compounds set in rapidly and are long-lasting. The active compounds of the present invention can therefore be used with very good results for the control of mites (Acarina).

In the case of the mites contemplated herein, particularly important are the spider mites (Tetranychidae), such as the two-spotted spider mite (*Tetranychus urticae*), the European red mite (*Panonychus ulmi*); gall mites, such as the currant gall mite (*Eriophyes ribis*) and the tarsonemids, such as *Tarsonemus pallidus*; and ticks; and the like.

The active compounds according to the instant invention can be utilized, if desired, in the form of the usual formulations or compositions with conventional inert (i.e., plant compatible or herbicidally inert) pesticidal diluents or extenders, i.e., diluents or extenders of the type usable in conventional pesticidal formulations or compositions, e.g., conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g., conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g., benzene, toluene, xylene, etc.), halogenated, especially chlorinated, aromatic hydrocarbons (e.g., chlorobenzenes), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols (e.g., glycol monomethyl ether, etc.), amides (e.g., dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, alumina, silica, chalk, i.e., calcium carbonate, talc, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides and acaricides, or insecticides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent, and preferably 0.5–90 percent, by weight of the mixture, whereas carrier composition mixtures suitable for direct application or field application generally contemplate those in which the active compound is present in an amount substantially between about 0.001–5 percent, preferably 0.05–1 percent, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.001–95 percent, and preferably 0.05–95 percent by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form for example, by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of active compound or even the 100 percent active substance alone, e.g., about 20–100 percent by weight of the active compound.

Furthermore, the present invention contemplates methods of selectively killing, combating or controlling pests, e.g., fungi and/or acarids, and more particularly methods of combating at least one fungi and acarids, which comprise applying to at least one of correspondingly (a) such fungi, (b) such acarids and (c) the corresponding habitat thereof, i.e., the locus to be protected, a correspondingly combative or toxic amount, i.e., a fungicidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, pouring, via dressings, incrustations, and the like.

It will be realized, of course, that the concentration of the particular active compound utilized in admixture with the carrier vehicle will depend upon the intended application. Therefore, in special cases, it is possible to go above or below the aforementioned concentration ranges.

The unexpected superiority and outstanding fungicidal and acaricidal activity of such active compounds usable according to the present invention are illustrated, without limitation, by the following examples. In the tables of these examples, the numbered compounds correspond to those identified by the same numbers in Table A above and in Examples 5 and 6 below.

EXAMPLE 1

Piricularia and Pellicularia test
Solvent: 4 parts by weight acetone
Dispersing agent: 0.05 parts by weight sodium oleate
Water: 95.75 parts by weight $H_2O$.
Other Additive: 0.2 parts by weight gelatin The amount of the particular active compound required for the desired concentration of such active compound in the spray liquor is mixed with the stated amount of solvent, and the resulting concentrate is diluted with the stated amount of water containing the stated additive.

Two batches each consisting of 30 rice plant about 2–4 weeks old are sprayed with the given spray liquor until dripping wet. The plants remain in a greenhouse at temperatures of 22° to 24° C and a relative atmospheric humidity of about 70 percent until such plants are dry. One batch of the plants is then inoculated with an aqueous suspension of 100,000 to 200,000 spores/ml of Piricularia oryzae (a) and placed in a chamber at 24°–26° C and 100 percent relative atmospheric humidity. The other batch of the plants is infected with a culture of *Pellicularia sasakii* (b) grown on malt agar and placed at 28°–30° C and 100 percent relative atmospheric humidity.

Five to 8 days after inoculation, the infestation of all the leaves present at the time of inoculation with *Piricularia oryzae* (a) is determined as a percentage of the untreated but also inoculated control plants. In the case of the plants infected with *Pellicularia sasakii* (b), the infestation on the leaf sheaths after the same period of time is also determined in proportion to the untreated but infected control plants.

Zero percent means no infestation; 100 percent means that the infestation is exactly as great as in the case of the control plants.

The particular active compounds tested, their concentrations, and the results obtained can be seen from the following Table 1:

Additional test (curative fungicidal effect)

In order to determine the curative fungicidal effect, the hereinbefore described test is repeated, but the particular active compound is applied not before, but instead 16 hours after, inoculation.

The particular active compounds tested, their concentrations, and the results obtained can likewise be seen from the following Table 1:

TABLE 1.—PIRICULARIA (a) AND PELLICULARIA (b) TEST

| | Infestation as a percentage of the infestation of the untreated control with a concentration of active compound (in percent) of— | |
|---|---|---|
| | (a) | (b) |
| Active compound number (see Table 5) | 0.05 | 0.25  0.05 |
| (A) 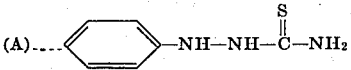 (known) | Pr.=0<br>Cur.=100 | 25   75 |
| (1₁) P Same as above | Pr.=0<br>Cur.=0 | 0   13 |
| (2₁) do | Pr.=0<br>Cur.=0 | 0   25 |
| (3₁) do | Pr.=0<br>Cur.=8 | 0   0 |
| (4₁) do | Pr.=0<br>Cur.=17 | 0 |
| (5₁) do | Pr.=0 | 0 |
| (11) do | Pr.=0<br>Cur.=25 | 0 |
| (7₁) do | Pr.=0 | 0   0 |
| (8₁) do | Cur.=75 | |
| (28) do | Pr.=0 | 0 |
| (29) do | Pr.=0<br>Cur.=0 | 0 |
| (24) do | Pr.=0<br>Cur.=0 | 0<br>75 |
| (30) do | Pr.=0<br>Cur.=8 | 0 |
| (25) do | Pr.=0 | 0 |

Pr.=protective.
Cur.=curative.

EXAMPLE 2

Podosphaera test (powdery mildew of apples) [Protective]

Solvent:   4.7 parts by weight acetone
Emulsifier:   0.3 part by weight alkylaryl polyglycol ether
Water:   95 parts by weight H₂O The amount of the particular active compound required for the desired concentration of such active compound in the spray liquid is mixed with the stated amount of solvent, and the resulting concentrate is diluted with the stated amount of water which contains the stated emulsifier.

Young apple seedlings in the four to six leaf stage are sprayed with the given spray liquid until dripping wet. The plants remain in a greenhouse for 24 hours at 20° C and at a relative atmospheric humidity of 70 percent. The plants are then inoculated by dusting with conidia of the apple powder mildew causative organism (*Podosphaera leucotricha* Salm.) and placed in a greenhouse at a temperature of 21°-23° C and at a relative atmospheric humidity of about 70 percent.

Ten days after the inoculation, the infestation of the seedlings is determined as a percentage of the untreated but also inoculated control plants.

Zero percent means no infestation; 100 percent means that the infestation is exactly as great as in the case of the control plants.

The particular active compounds tested, their concentrations, and the results obtained can be seen from the following Table 2:

TABLE 2.—PODOSPHAERA TEST (PROTECTIVE)

| | Infestation as a percentage of the infestation of the untreated control with a concentration of active compound (in percent) of— | |
|---|---|---|
| Active compound number (see Table 5) | 0.025 | 0.0062 |
| (A) $\langle$ ⟩—NH—NH—C(=S)—NH₂ (known) | 86 | 100 |
| (1₂) Same as above | 0 | 29 |
| (2₂) do | 0 | 73 |
| (3₂) do | 0 | 39 |
| (4₂) do | 1 | 25 |
| (9₁) do | 3 | 33 |
| (8₂) do | 18 | 42 |
| (10₁) do | 14 | |

EXAMPLE 3

Fusicladium test (apple scab) [Protective]

Solvent:   4.7 parts by weight acetone
Emulsifier:   0.3 part by weight alkylaryl polyglycol ether
Water:   95 parts by weight H₂O The amount of the particular active compound required for the desired concentration of such active compound in the spray liquid is mixed with the stated amount of solvent, and the resulting concentrate is diluted with the stated amount of water which contains the stated emulsifier.

Young apple seedlings in the four to six leaf stage are sprayed with the spray liquid until dripping wet. The plants remain in a greenhouse for 24 hours at 20° C and at a relative atmospheric humidity of 70 percent. Such plants are then inoculated with an aqueous conidium suspension of the apple scab causative organism (*Fusicladium dendriticum* Fuck.) and incubated for 18 hours in a humidity chamber at 18°-20° C and at a relative atmospheric humidity of 100 percent.

The plants then again are placed in a greenhouse for 14 days.

Fifteen days after inoculation, the infestation of the seedlings is determined as a percentage of the untreated but also inoculated control plants.

Zero percent means no infestation; 100 percent means that the infestation is exactly as great as in the case of the control plants.

The particular active compounds tested, their concentrations, and the results obtained can be seen from the following Table 3:

TABLE 3.—FUSICLADIUM TEST (PROTECTIVE)

| | Infestation as a percentage of the infestation of the untreated control with a concentration of active compound (in percent) of— | |
|---|---|---|
| Active compound number (see Table 5) | 0.025 | 0.0062 |
| (A) 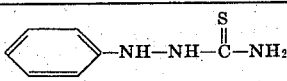 (known) | 19 | 38 |
| (1₃) Same as above | 0 | 0 |
| (2₃) do | 0 | 0 |
| (3₃) do | 0 | 7 |
| (5₂) do | 5 | 12 |
| (6₂) do | 14 | 17 |
| (11₁) do | 0 | 2 |
| (9₂) do | 5 | 2 |
| (12₁) do | 14 | 12 |
| (7₂) do | 2 | 2 |
| (10₂) do | 2 | 17 |

EXAMPLE 4

Tetranychus test
  Solvent: 3 parts by weight dimethyl formamide
  Emulsifier: 1 part by weight alkylaryl polyglycol ether To produce a suitable preparation of the particular active compound, one part by weight of such active compound is mixed with the stated amount of solvent containing the stated amount of emulsifier, and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus urticae*) in all stages of development.

After the specified period of time, the effectiveness of the given preparation of active compound is determined by counting the dead mites. The degree of destruction thus obtained is expressed as a percentage: 100 percent means that all the spider mites are killed, whereas 0 percent means that none of the spider mites are killed.

The particular active compounds tested, their concentrations, the evaluation time and the results obtained can be seen from the following Table 4:

TABLE 4.—(PLANT-DAMAGING MITES)

| Active compound number (see Table 5) | Concentration of active compound in percent | Degree of destruction in percent after 8 days |
|---|---|---|
| (A)  —NH—NH—$\overset{S}{\underset{\parallel}{C}}$—NH$_2$ (known) | 0.2 | 0 |
| (1$_s$) Same as above | 0.2 | 100 |
| (2$_s$) do | 0.2 | 98 |
| (3$_s$) do | 0.2 | 100 |
| (4$_s$) do | 0.2 | 98 |
| (5$_s$) do | 0.2 | 100 |
| (6$_s$) do | 0.2 | 100 |
| (9$_s$) do | 0.2 | 98 |
| (12$_2$) do | 0.2 | 90 |
| (7$_s$) do | 0.2 | 98 |
|  | 0.02 | 98 |
| (8$_s$) do | 0.2 | 100 |
|  | 0.02 | 98 |
| (10$_s$) do | 0.2 | 100 |
|  | 0.02 | 90 |

The following further examples are set forth to illustrate, without limitation, the process for producing the active compounds according to the present invention.

EXAMPLE 5

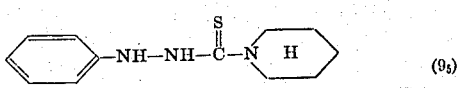  (1$_s$)

59.4 g (0.3 mol) of 1phenyl-hydrazine-2-dithio-carboxylic acid methyl ester are suspended in 250 ml methanol. 67.5 g (0.6 mol) of 40 percent aqueous dimethylamine are added, and the mixture is heated gradually to the boil. After boiling under reflux for 5 hours, cooling to 0° C is effected; the crystalline product is filtered off with suction and dried.

Yield: 47.4 g (81% of the theory) of 1-phenyl-4,4-dimethyl-thiosemicarbazide. m.p. 133° to 134° C (toluene).

In corresponding manner, there are obtained:

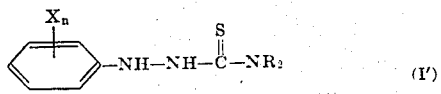  (I')

TABLE 5

| Number | X$_n$= | NR$_2$= | M.P. (° C.) | Recrystallized from |
|---|---|---|---|---|
| (2$_s$) | H | —N(C$_2$H$_5$)$_2$ | 72 | Carbon tetrachloride. |
| (3$_s$) | H | —N(n-C$_3$H$_7$)$_2$ | 98-99 | White spirit. |
| (4$_s$) | H | —N(n-C$_4$H$_9$)$_2$ | 62 | Do. |
| (5$_s$) | H | —N[CH$_2$—CH(CH$_3$)$_2$]$_2$ | 60-61 | Butanol. |
| (6$_s$) | H | —N(CH$_2$—CH=CH$_2$)$_2$ | 62-63 | White spirit. |
| (11$_2$) | H | —N⟨H⟩ (piperidine) | 192-194 | Dioxan. |
| (9$_s$) | H | —N⟨H⟩ (pyrrolidine) | 117 | Carbon tetrachloride. |
| (12$_3$) | H | —N⟨H O⟩ (morpholine) | 141-143 | Ethanol. |
| (7$_s$) | p-Cl | —N(CH$_3$)$_2$ | 192 | Butanol. |
| (8$_s$) | p-Cl | —N(C$_2$H$_5$)$_2$ | 79-80 | White spirit. |
| (10$_s$) | p-Cl | —N(n-C$_3$H$_7$)$_2$ | 101 | Ethanol. |
| (28) | m-Cl | —N(CH$_3$)$_2$ | 154 | Do. |
| (29) | m-Cl | —N(n-C$_3$H$_7$)$_2$ | 120 | Do. |
| (20) | 3,4-di-Cl | —N(CH$_3$)$_2$ | 152 | Do. |
| (24) | p-CH$_3$ | —N(CH$_3$)$_2$ | 142-143 | Do. |
| (30) | p-CH$_3$ | —N(n-C$_3$H$_7$)$_2$ | 58 | Do. |
| (25) | p-OCH$_3$ | —N(CH$_3$)$_2$ | 151 | Do. |

EXAMPLE 6

⟨⟩—NH—NH—$\overset{S}{\underset{\parallel}{C}}$—N⟨H⟩   (9$_s$)

30.6 g (0.26 mol) of piperidine are added to a solution of 0.3 mol of the sodium salt of N-phenyl-hydrazine-2-dithio-carboxylic acid carboxymethyl ester in 250 ml of water. The mixture is gradually heated to the boil and boiled under reflux for 4 hours. After cooling, the separated crystals are filtered off with suction, washed with water and dried.

Yield: 51.5 g (73% of the theory) of 1-phenyl-4,4-(pentamethyl-ene)-thiosemicarbazide.

m.p. 117° C (carbon tetrachloride).

It will be realized by the artisan that all of the foregoing compounds contemplated by the present invention possess the desired strong pesticidal, especially fungicidal and acaricidal, properties, with regard to a broad spectrum of activity, as well as a comparatively low toxicity toward warm-blooded creatures and a concomitantly low phytotoxicity, enabling such compounds to be used with correspondingly favorable compatibility with respect to warm-blooded creatures and plants for more effective control and/or elimination of fungi and/or acarids by application of such compounds to such fungi, acarids, and/or the corresponding habitat.

It will be appreciated that the instant specification and examples are set forth by way of illustration and not limitation, and that various modifications and changes may be made without departing from the spirit and scope of the present invention.

What is claimed is:

1. Method of controlling acarids, which comprises applying to at least one of (a) such acarids or (b) the corresponding habitat thereof, a toxic amount of a 1-phenyl-4,4-di-substituted-thiosemicarbazide of the formula

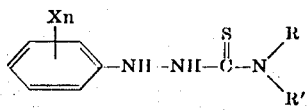

in which X is selected from the group consisting of chloro, bromo, methyl and methoxy, $n$ is a whole number from 0 to 3, and R and R', each individually, is selected from the group consisting of alkyl of one to four carbon atoms and alkenyl of three to four carbon atoms.

2. Method according to claim 1 wherein such compound is used in the form of a mixture with a dispersible carrier vehicle, said compound being present in a toxic amount and constituting substantially between about 0.001–95 percent by weight of the mixture.

3. Method according to claim 1 wherein X is selected from the group consisting of 2-chloro, 3-chloro, 4-chloro, 4-bromo, 4-methyl, 4-methoxy, 2,3-dichloro, 2,4-dichloro, 3,4-dichloro, 3-chloro-4-methyl, 3-chloro-4-methoxy, 2,3,6-trichloro and 2,4,6-trichloro, $n$ is 0–3, R and R', each individually, is selected from the group consisting of $C_{1-4}$ alkyl and $C_3$ alkenyl.

4. Method according to claim 1 wherein X is chloro, $n$ is 0–1, and R and R', each individually, is selected from the group consisting of $C_{1-4}$ alkyl and $C_3$ alkenyl.

5. Method according to claim 1 wherein X is chloro, $n$ is 0–1, and R and R' are the same and are selected from the group consisting of $C_{1-4}$ alkyl and $\alpha$-allyl.

6. Method according to claim 1 wherein such compound is 1-phenyl-4,4-dimethyl-thiosemicarbazide.

7. Method according to claim 1 wherein such compound is 1-phenyl-4,4-diethyl-thiosemicarbazide.

8. Method according to claim 1 wherein such compound is 1-phenyl-4,4-dipropyl-thiosemicarbazide.

9. Method according to claim 1 wherein such compound is 1-(4'-chloro-phenyl)-4,4-dimethyl-thiosemicarbazide.

* * * * *